(12) United States Patent
Chen et al.

(10) Patent No.: US 8,630,479 B2
(45) Date of Patent: Jan. 14, 2014

(54) METHODS AND SYSTEMS FOR IMPROVED LOCALIZED FEATURE QUANTIFICATION IN SURFACE METROLOGY TOOLS

(75) Inventors: Haiguang Chen, Mountain View, CA (US); Jaydeep Sinha, Livermore, CA (US); Shouhong Tang, Santa Clara, CA (US); John Hager, San Francisco, CA (US); Andrew Zeng, Fremont, CA (US); Sergey Kamensky, Campbell, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 388 days.

(21) Appl. No.: 12/986,176

(22) Filed: Jan. 7, 2011

(65) Prior Publication Data

US 2012/0177282 A1 Jul. 12, 2012

(51) Int. Cl.
*G06K 9/00* (2006.01)

(52) U.S. Cl.
USPC ............................................. 382/145; 703/13

(58) Field of Classification Search
USPC ............................................. 382/145; 703/13
See application file for complete search history.

(56) References Cited

U.S. PATENT DOCUMENTS

| 7,271,921 B2 | 9/2007 | Shortt | |
| 2004/0110323 A1* | 6/2004 | Becker et al. | 438/127 |
| 2004/0175631 A1* | 9/2004 | Crocker et al. | 430/5 |
| 2004/0239905 A1 | 12/2004 | Van Rhee | |
| 2009/0037134 A1 | 2/2009 | Kulkarni | |
| 2009/0276176 A1* | 11/2009 | Schulze et al. | 702/85 |
| 2011/0172982 A1* | 7/2011 | Veeraraghavan et al. | 703/13 |

FOREIGN PATENT DOCUMENTS

WO    WO2010/025334 A1    3/2010

OTHER PUBLICATIONS

K. Freischlad et al, "Interferometry for wafer dimensional metrology", Proceedings of SPIE, 6672, 1 (2007).

* cited by examiner

*Primary Examiner* — Hadi Akhavannik
(74) *Attorney, Agent, or Firm* — Suiter Swantz pc llo

(57) ABSTRACT

A method for enabling more accurate measurements of localized features on wafers is disclosed. The method includes: a) performing high order surface fitting to more effectively remove the low frequency shape components and also to reduce possible signal attenuations commonly observed from SEMI standard high pass, such as Gaussian and Double Gaussian filtering; b) constructing and applying a proper two dimensional LFM window to the residual image from the surface fitting processing stage to effectively reduce the residual artifacts at the region boundaries; c) calculating the metrics of the region using the artifact-reduced image to obtain more accurate and reliable measurements; and d) using site-based metrics obtained from front and back surface data to quantify the features of interest. Additional steps may also include: filtering data from measurements of localized features on wafers and adjusting the filtering behavior according to the statistics of extreme data samples.

19 Claims, 17 Drawing Sheets

METHODS AND SYSTEMS FOR IMPROVED LOCALIZED FEATURE QUANTIFICATION IN SURFACE METROLOGY TOOLS

FIELD OF THE INVENTION

This invention relates to metrology of semiconductor wafers, and in particular to methods for improving the accuracy and robustness of several important surface features of wafer front and back surfaces, thickness and shape measurements.

BACKGROUND

As integrated circuits become faster and denser, requirements for control of topographical features such as planarity, shape, and thickness become increasingly stringent. The necessity for verifying that a given wafer is sufficiently planar and within specifications, i.e. in qualifying and selecting wafers even before processing begins or during processing, is becoming ever greater. A critical component in the characterization of wafers is the wafer topography, sometimes termed substrate geometry.

Wafer topography (i.e., substrate geometry) can be described according to traditional parameters such as shape, thickness/flatness, and nanotopography (NT). These parameters have different characteristics, which are defined in detail in *SEMI standards M1, Appendices 1 and 2*. *SEMI standards M1* is hereby incorporated by reference in its entirety. Note that shape and flatness tend to be low frequency component descriptions of a wafer. Nanotopography is defined in (SEMI standards M41) as the non-planar deviation of the whole front wafer surface within a spatial wavelength range of app. 0.2 to 20 mm and within the fixed quality area. NT features may occur as point, line, or area features. Examples of point features are dimples; examples of area features are epi pins or crowns, bumps on notches or lasermarks; examples of line features are: saw marks from slicing, scratches, slip lines, dopant striation or other process signatures. The individual front/back surface nanotopography of a wafer substrate is typically obtained from the front/back topography by applying high pass filtering schemes such as Double Gaussian (DG) filtering to the topography data, which suppresses the low frequency components of the wafer topography. The substrate NT features are seen to affect the lithography process, for example by contributing to defocus and overlay errors. Characterization and quantification of higher order components of shape and more localized shape features are described in PCT publication No. WO 2010/025334, U.S. Provisional application No. 61/092,720, and U.S. application Ser. No. 12/778,013 all of which are incorporated by reference in their entireties.

As integrated circuit technology progresses to smaller nodes, i.e., as design rules get smaller, localized topography qualification of both wafer front and back surfaces is gaining interest. These localized, higher frequency topographic features in general cannot be fully corrected by lithography scanners. Therefore these features can cause localized defocus and overlay errors, and ultimately lower the yield. A special type of quantification methodology known as Localized Feature Metrics (LFM) has been recently developed by KLA-Tencor. This methodology is effective in detecting and quantifying several types of yield limiting regions on wafer surfaces. Prior methodologies of NT characterization are optimized for full wafer characterization, and are limited in accurately capturing and quantifying localized regions of interest. For example, for some surface features, DG filtering schemes may attenuate the signal of interest. For higher frequency surface feature quantification and detection, DG may still leave some long wavelength components for the large cutoff wavelength setting. Additionally, local feature quantification using NT filtering schemes can introduce signal artifacts which can adversely affect quantification accuracy near the wafer edge region.

Another issue in metrology of localized features concerns the maximum and minimum values of a given image region which are used to calculate many metrics. In moving to the higher resolution metrology for the next generation nodes, when the high frequency features are measured in the localized feature metric (LFM), and when the input data is not stable, the extreme statistics can often generate noisy measurements and cause difficulties in meeting repeatability and matching requirements. This is especially true for the LFM quantification methodology of features at the wafer edge regions, such as laser marks and notches. It has been observed that the extreme maximum and minimum values in those regions may result in severe degradation of the measurement quality.

Methods for providing more robust and accurate measurements of localized features would give added value.

SUMMARY

A method for enabling more accurate measurements of localized features on wafers is disclosed. To emulate lithography fields this wafer topography quantification is often performed in a rectangular region. Quantification methodologies are similar to what are currently in practice for wafer flatness, e.g., SFQR, SBIR. Front and back surface site-based metrics are used. To detect and quantify a localized feature such as an epi pin, a rectangular region centered on the feature is constructed around it. However, such a construction tends to produce artifact errors at the region edges, and especially at the corners during the surface data processing stage. This is due to the longer spatial distance of the corners from most of the data samples. A method is disclosed herein for suppressing the error-prone edge and corner areas while maintaining the accuracy in the critical center area containing the feature. The method includes:

a) performing high order surface fitting to more effectively remove the low frequency shape components and also to reduce the possible signal attenuations commonly observed from DG filtering;

b) constructing and applying a proper two dimensional LFM window to the residual image from the surface fitting processing stage to effectively reduce the residual artifacts at the region boundaries;

c) calculating the metrics of the region using the artifact-reduced image to obtain more accurate and reliable measurements; and d) using site-based metrics obtained from front and back surface data to quantify the features of interest.

A method for filtering data from measurements of localized features on wafers is disclosed. This method includes an algorithm designed to adjust the filtering behavior according to the statistics of extreme data samples, specifically three peak and three valley data samples. Depending on the spread of these sample vales, the filter output can be very close to the simple mean of three data samples, trimmed mean of two data samples, or median of the three samples. Use of this filtering algorithm can result in more stable measurement results and considerable improvement in precision.

Both of the inventive methods address extraneous, unwanted signals that adversely affect the accuracy and/or robustness of localized feature measurement. In one case, the extraneous signals result from fitting artifacts, in the other case, the extraneous signals are from extreme data samples such as spikes.

A method for utilizing the 2D window and the data filtering to yield a more robust and more accurate Localized Feature quantification methodology is disclosed.

DETAILED DESCRIPTION

A dimensional metrology tool such as WaferSight2 from KLA-Tencor provides the utility of measuring front-side and back-side topography, as well as thickness/flatness, simultaneously. This tool is described in K Freischlad, S. Tang, and J. Grenfell, "*Interferometry for wafer dimensional metrology*", *Proceedings of SPIE*, 6672, 1 (2007), which is hereby incorporated by reference in its entirety. An aspect of the instant invention is extending wafer surface quantification to localized feature-based wafer surface quantification. This methodology also incorporates the wafer front and back surface maps, in addition to the wafer thickness map. Raw data used in the instant methods may be obtained from those wafer maps.

Figure 1:
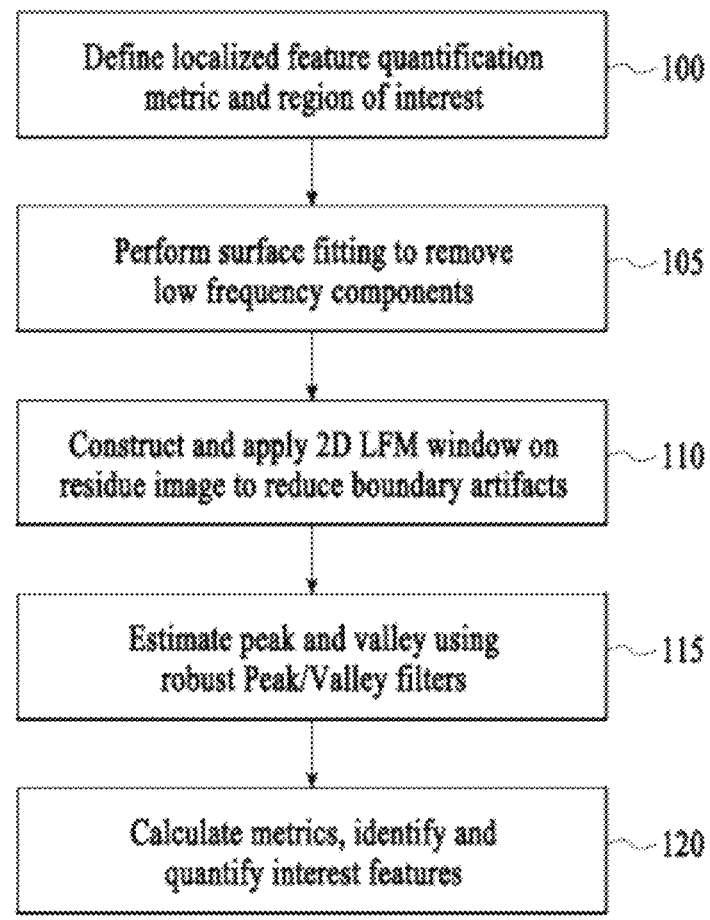
FIG. 1 is a flow diagram of an inventive Localized Feature quantification methodology according to the present invention.

FIG. 1 is a flow diagram of an inventive Localized Feature quantification methodology according to the present invention.

In step 100, define a Region of Interest (ROI) around a specific local feature of interest, and define an appropriate localized feature quantification metric in the ROI. Multiple localized regions of interest can be characterized simultaneously. The region of interest can be square, rectangular, or circular, as exemplary but not limiting shapes. The square and rectangular regions can be rotated. The region shape and angular orientation is defined according to the specific feature under analysis, to best fit the feature. Examples of the quantification metric are range, deviation, most positive deviation, most negative deviation. Localized feature measurements can be applied in high volume manufacturing applications for wafer grading and/or factory automation (FA).

In step 105, perform surface fitting to remove low frequency components of the surface geometry data in the ROI, yielding a residual image $R(x,y)$. Depending on the application, i.e., the type of features, the filtering can be Double Gaussian (DG) filtering, or higher order polynomial fitting using Taylor or Zernike polynomials. Polynomial surface fitting is specifically tailored to the feature of interest, e.g., different orders of a series expansion will be filtered out according to the configuration of the feature of interest. By way of example, the filtering for a notch feature will generally be of a lower order than the filtering for an epi pin feature. By further way of example, different basis functions can be used for surface fitting according to the planar geometric shape of the ROI, which is chosen to best fit the feature of interest. To accurately characterize the region of interest, unwanted effects from neighboring areas may be masked and excluded. Note that the surface fitting may also be tailored to the background under analysis to provide for effective background removal. For example, if the background has a known surface shape well described by some basis functions, these basis functions can then be used for effective and efficient background removal with minimum damage to the feature signal of interest.

An advantage of using higher order polynomial surface fitting is that it can better address features at the wafer edge region and the laser mark region, where invalid data often occur, than can the DG filter.

In step 110, after the residual images $R(x,y)$ are obtained using the surface filtering of step 105, two dimensional LFM windows are constructed and applied to (i.e., multiplied with pixel-by-pixel) the residual images to suppress the edge and corner artifacts, yielding window-processed residual mages $R_w(x,y)$. These images can be displayed as two dimensional or three dimensional images. The window may have different shapes and weighting patterns according to the feature under analysis, by setting two window control parameters.

In step 115, estimate maximum positive signal values, or estimate peak and valley signal values using filters such as robust peak/valley filters. This may involve applying robust peak and valley filtering on a number of extreme data samples, six by way of example, to remove spike noise and smooth background noise. This allows more accurate and reliable peak/valley estimates.

In step 120, calculate the feature metrics of the feature of interest, using the robust peak/valley values or maximum positive values (obtained in step 115) from the window-processed residual image (obtained in step 110). This provides more accurate and reliable product-relevant metrology information about the feature of interest.

A. Constructing and Using Two Dimensional Windows for LFM Applications

In signal processing, a window function (also known as an apodization function or tapering function) is a mathematical function that is zero-valued outside of some chosen interval.

For instance, a function that is constant inside the interval and zero elsewhere is called a rectangular window, which describes the shape of its graphical representation. When another function or a signal (data) is multiplied by a window function, the product is also zero-valued outside the interval: all that is left is the part where they overlap; the "view through the window". Applications of window functions include spectral analysis, filter design, and beamforming.

An aspect of the inventive method, as in step 110, is constructing 2 Dimensional windows to be used with LFM quantification methodology. These 2D windows may be of different shapes according to the localized features under analysis, in order to preserve the signal components while effectively reducing the boundary fitting artifacts. For example, if the feature of interest is a notch, the signal of interest may be located near the center of the region boundary. Accordingly, in this case, a 2D LFM window is used which only attenuates the signal in the corner regions. The 2D window using the window models presented here provides good signal preservation in the critical region containing the feature, and also provides strong fitting artifact suppression in the region boundaries, especially at the region corners. This aspect will be discussed in more detail hereinafter and some examples of possible window shapes will be presented. The window can be easily adjusted for different applications, such as EPI pin, laser mark, and notches. Applying the 2D window to the residual image (after first fitting the measurement data to a surface function with selected order to represent the low frequency components of the data, then subtraction of this fitted surface from the data to generate the residual image containing the contrast-enhanced features of interest) can produce more accurate measurements of the signal, and less artifact error. The high order surface fitting can more easily and accurately handle features at regions such as the wafer edge region and the laser mark region, where there are often invalid pixels. The method utilizes localized site-based quantification methodology for both the front and back surfaces.

Figure 2:
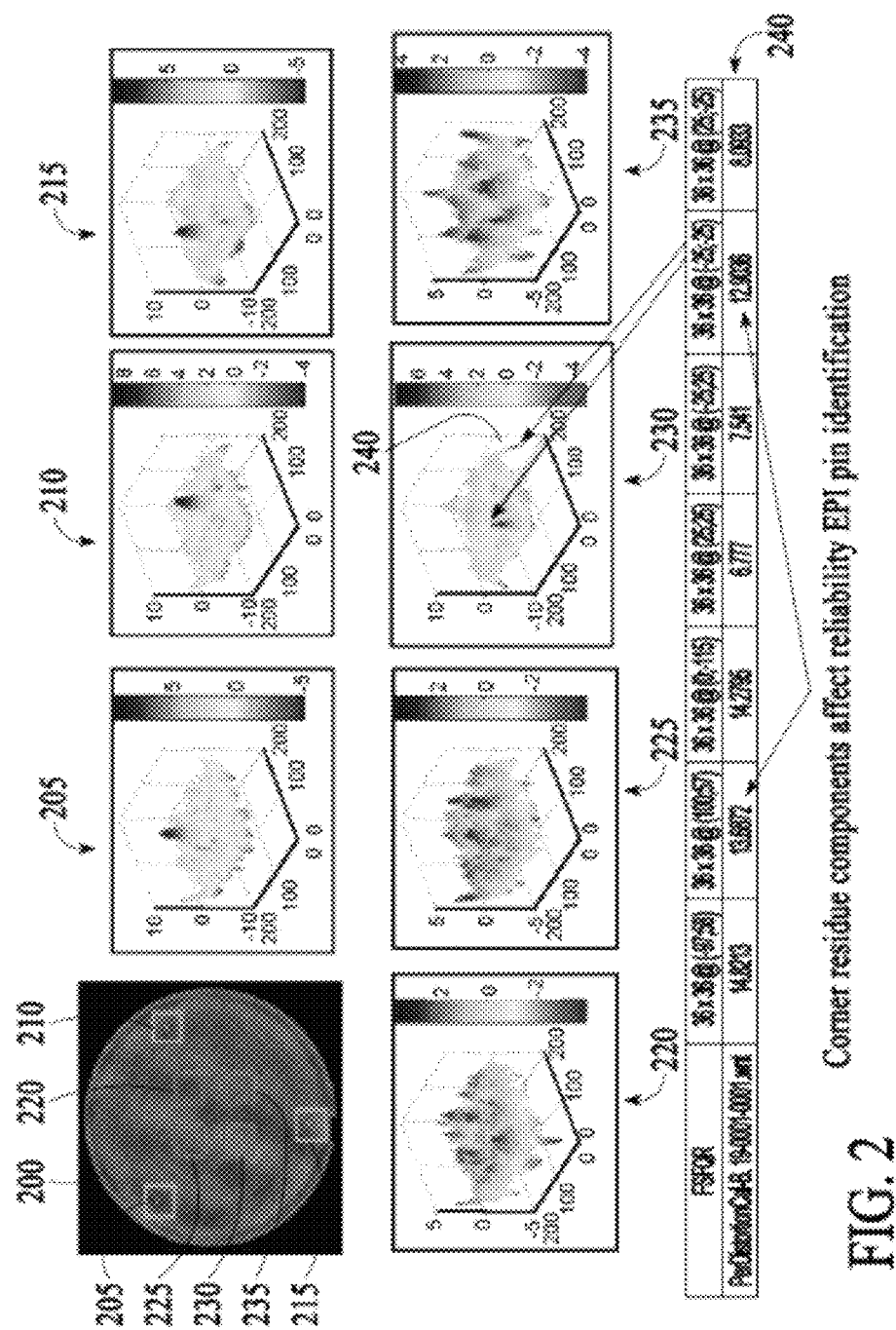
FIG. 2 illustrates an example of the edge- and corner-artifact problem when the 2D LFM window is not used.

An example of the edge- and corner-artifact problem when the 2D window is not used is illustrated in FIG. 2. Wafer 200 has 3 epi-pin defects 205, 210, and 215, and four reference regions without defects, 220, 225, 230, and 235. Mesh plots of each of these seven regions are produced after high order surface fitting is used to remove the low frequency shape components in these regions and obtain the residual images. The maximum and minimum values of these images are calculated for FSFQR/FSFQD values, and the maximum amplitudes (i.e., maximum value−minimum value) are shown in order in row 240 beneath the mesh plots. The amplitudes are compared and utilized for EPI pin defect detection and quantification. FIG. 2 shows that the maximum amplitude for reference region 230, 12.9036, is comparable to the maximum amplitude for epi pin defect 210, 13.6872. This is because, although the high-order surface fitting can effectively remove the low frequency shape components, the residual images still usually have high amplitudes at the image corner regions. An example is at corner 240 of reference region 230. This is a fundamental issue with surface fitting based on a least mean square fitting method, where no control points have been applied on the image and, as a result, the region boundaries, especially the region corners, have bigger fitting errors. As a result of the fitting errors at the corners, in the example shown, the metric value of the epi pin defect is very close to that of the third reference region, and the epi pin defect cannot be properly detected based on these metric values. The fitting errors at the edges and corners cannot be simply reduced by using even higher orders of polynomials in the surface fitting process, for several reasons:

First, it may cause the signals to be damaged, since higher order surface fitting will fit more closely to the high frequency signal components, and thus attenuates these components in the residual image. Second, since the number of possible inflections on the fitted surface depends on the fitting polynomial order, higher polynomial orders may generate surface ripples, which will affect the accuracy of range and deviation calculations. Higher order fitting polynomials also require more computation cost.

Two Dimensional Window for Fitting Artifact Suppression

In order to effectively reduce the boundary edge and corner fitting artifacts as described above, while avoiding very high order surface fitting so as to better preserve the surface signal, appropriate two dimensional windows can be constructed and used for LFM applications.

Figure 3A:
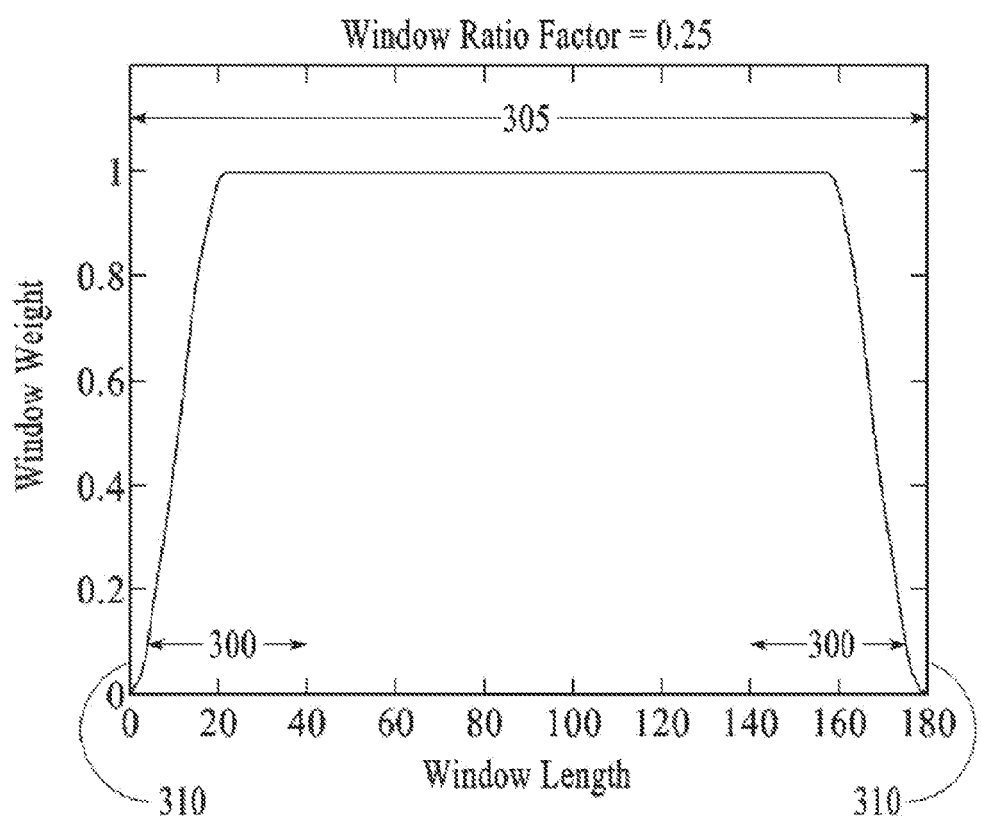
FIG. 3A illustrates a one-dimensional Tukey window.

A first example of a two-dimensional window for LFM applications is a two-dimensional LFM window based on Tukey windows. One dimensional Tukey windows have been widely used in spectral analysis to modify a signal so as to reduce the side lobes in the signal spectrum. FIG. 3A illustrates an example of a one-dimensional Tukey window. The one-dimensional Tukey window has the functional form of:

Turkey window $$w_0(n) = \begin{cases} \frac{1}{2}\left[1 + \cos\left(\pi \frac{|n| - \alpha\frac{N}{2}}{(1-\alpha)\frac{N}{2}}\right)\right] & \text{when } \frac{\alpha N}{2} \leq |n| \leq \frac{N}{2} \\ 1 & \text{when } 0 \leq |n| \leq \frac{\alpha N}{2} \end{cases}$$

where N is the window length, and $\alpha$ is the window parameter.

Figure 3B:
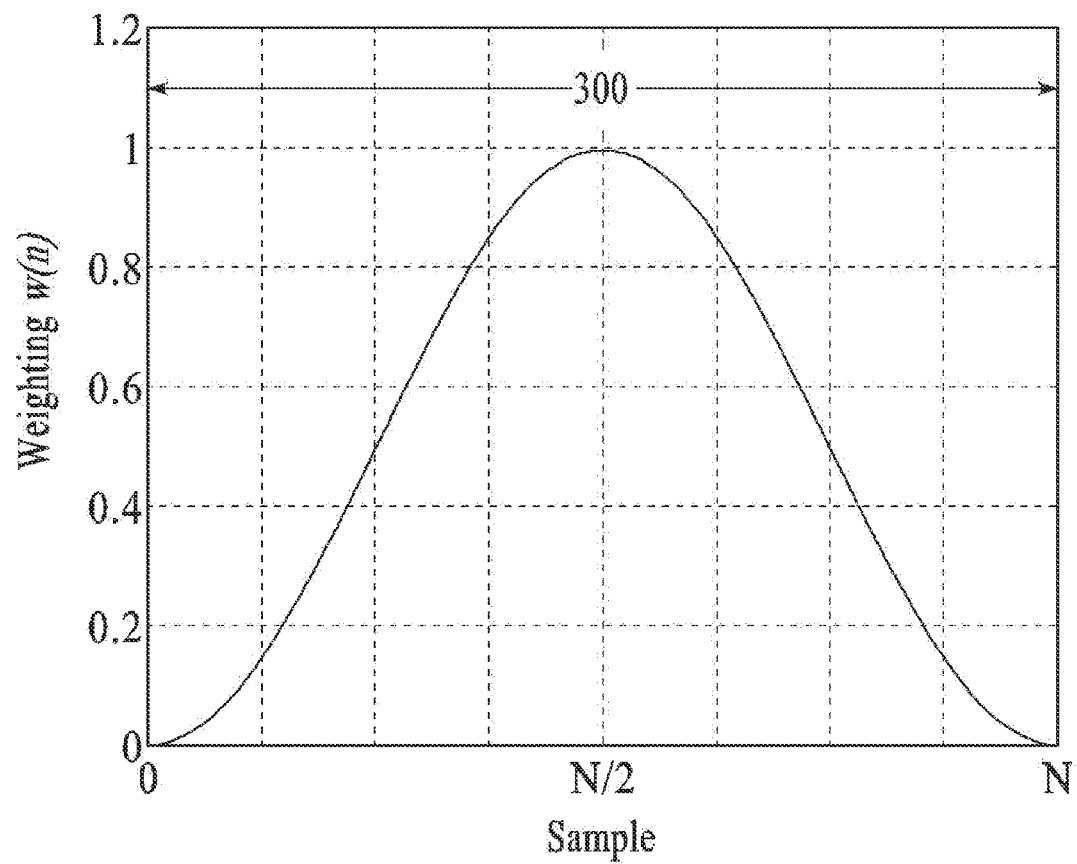
FIG. 3B illustrates a one-dimensional Hann window.
Figure 3C:
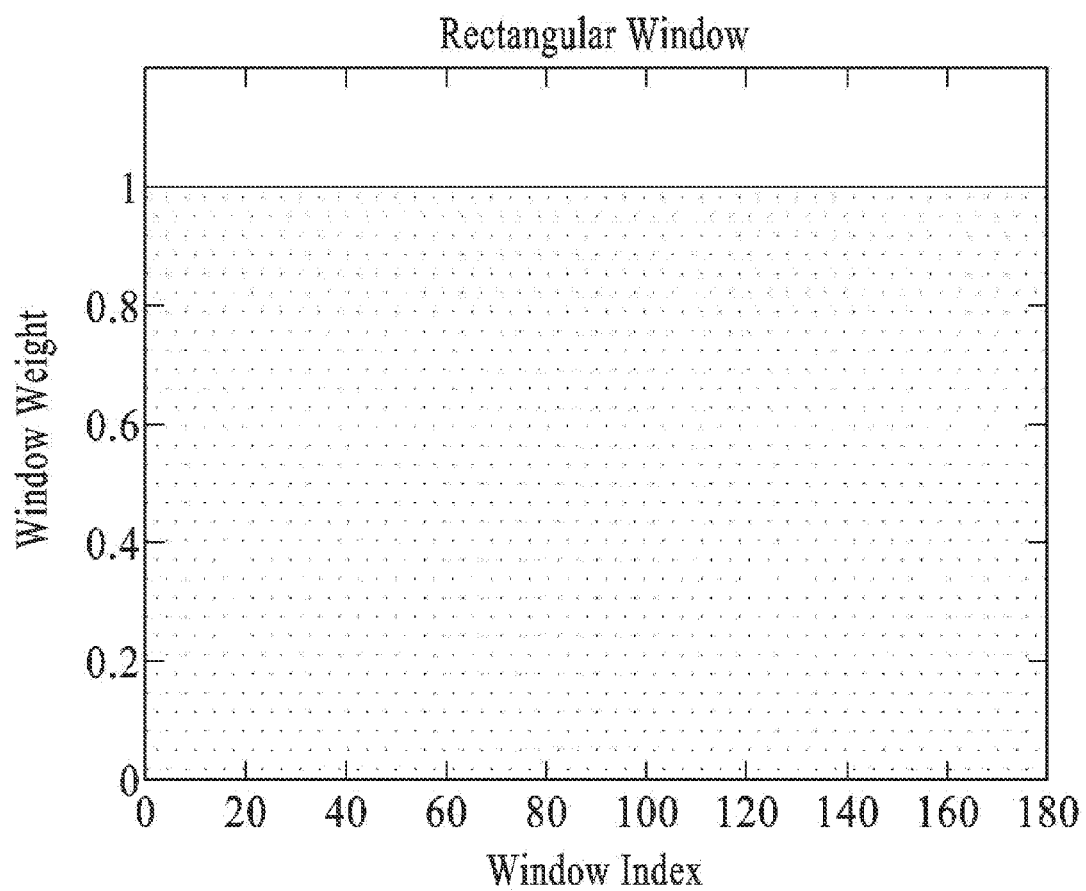
FIG. 3C illustrates a one-dimensional boxcar (rectangular) window.

The Tukey window shape can be adjusted using the parameter $\alpha(0 \leq \alpha \leq 1)$, which is the ratio of the taper part 300 to the window length 305. When $\alpha=1$, the Tukey window is equivalent to a Hann window, illustrated in FIG. 3B, and when $\alpha=0$, the Tukey window is equivalent to a boxcar or rectangular window, illustrated in FIG. 3C. In FIG. 3A, $\alpha=0.25$. The window smoothly weights the data to zero at the window boundaries 310, and in the window central region, the weight is 1, and therefore will not attenuate the signal in the central region.

A two-dimensional LFM window has been developed to suppress the surface fitting artifacts at the region corners. The two-dimensional LFM window has been developed by modifying the one-dimensional Tukey window described above, and extending it to two-dimensional form. It is defined as follows:

Given an image with width W and height H, the window function is defined as:

$$r(x, y) = \sqrt{\left[\frac{x - W/2}{W/2}\right]^2 + \left[\frac{y - H/2}{H/2}\right]^2},$$

$0 \leq x < W$ and $0 \leq y < H$.

$w(x, y) = 1.0$, when $r \leq T$, where $T \leq 1.0$.

$w(x, y) = 0.5 * (1.0 + \cos(r'\pi))$, when $r > T$, where $r' = \min(1.0, k*(r-T))$.

The window parameter T defines the transition value of the normalized radius value at which the weighting transitions from the constant region to the smooth attenuation region, and the window parameter k determines the maximum attenuation provided by the window. Note that the window is defined radially, whereas the region is rectangular, which yields more suppression at the corners of the rectangle.

Figure 4:
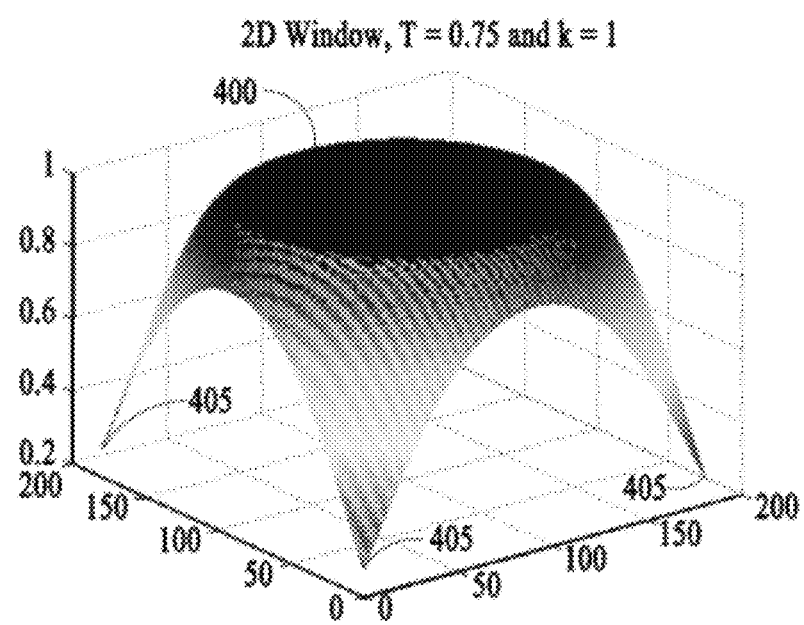
FIG. 4 illustrates an exemplary 2D LFM window, with T=0.75, and k=1.
Figure 5:
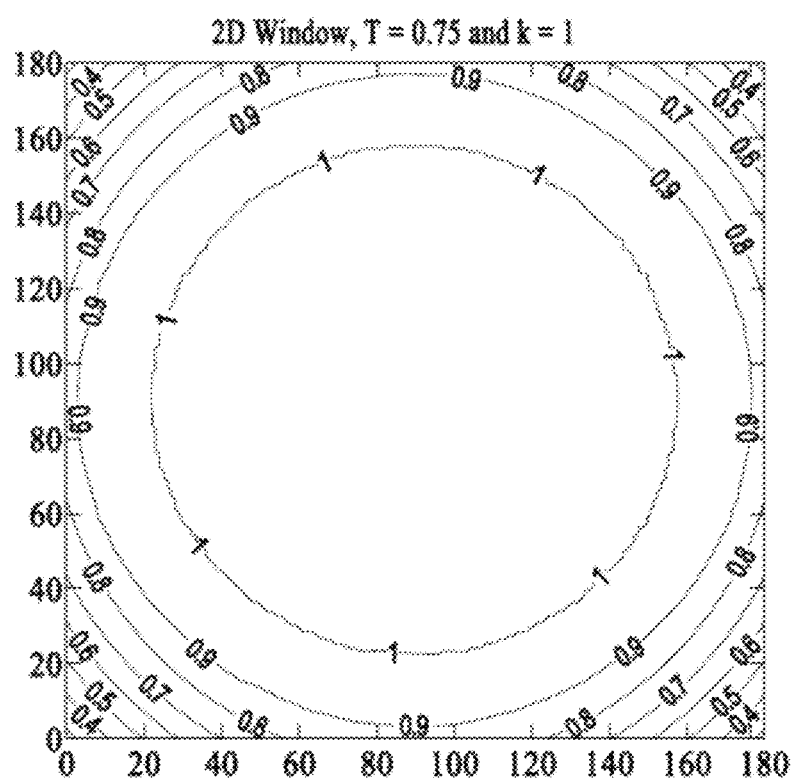
FIG. 5 shows a corresponding contour map for the window of FIG. 4.

FIG. 4 illustrates an exemplary 2D LFM window, with T=0.75, and k=1. FIG. 5 shows a corresponding contour map for the window of FIG. 4. FIG. 4 clearly shows that the signal in window center region 400 is well preserved, while the signal in region corners 405 is effectively suppressed. Note that the normalized radius at corners 405, i.e. the distance from the window center to the corners, is Sqrt(2). In comparison, the normalized distance from the window center to the edge is 1 for the one dimensional case, and also from the window center to the edge center for the 2D case. As a result, there is more attenuation at the corners than at the edges of the regions.

It is possible to design a 2 dimensional LFM window so that the weighting is not reduced to zero at the region boundaries. For example, this would be the case if k=1 and T=1. This would allow certain boundary signal components to remain after the window processing, for example leaving the edge centers unaffected, while suppressing the corners.

Figure 6:
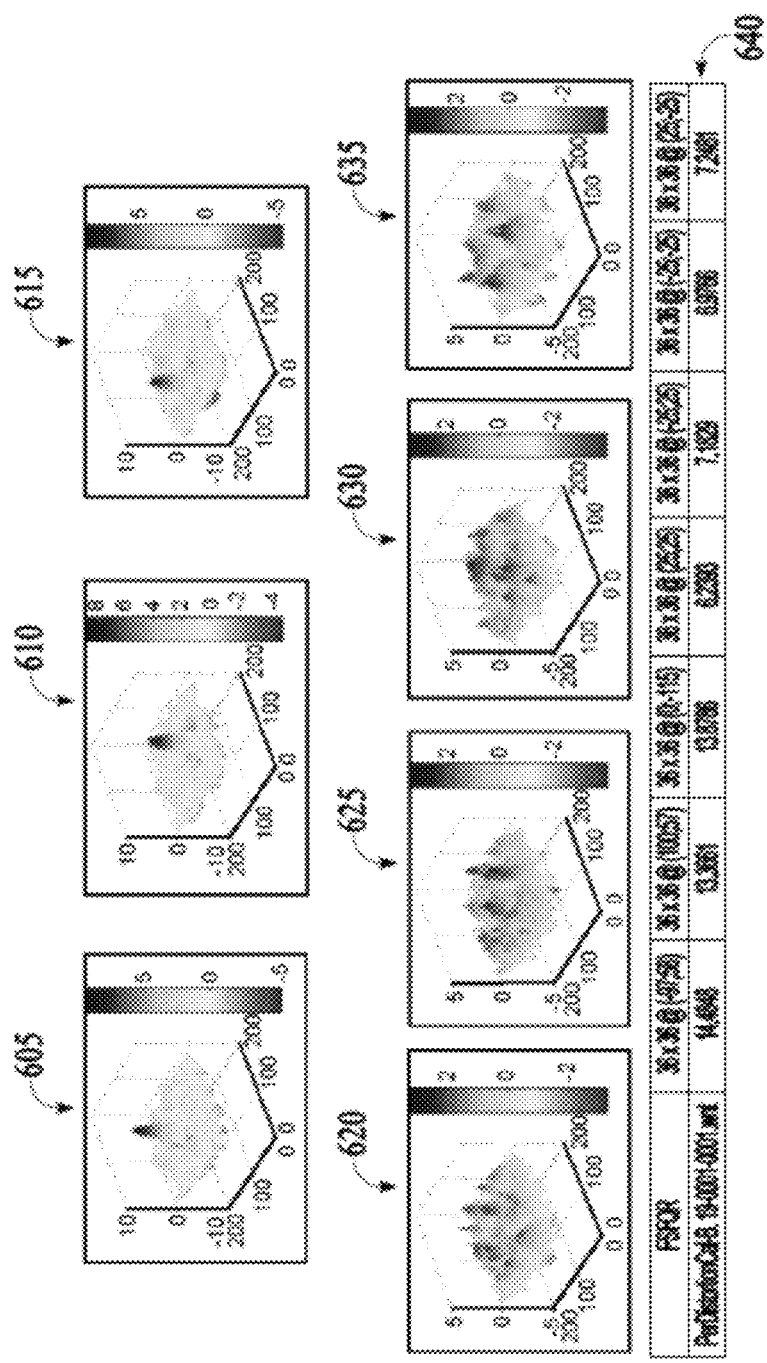
FIG. 6 shows processed EPI pin images corresponding to the images of FIG. 2.

FIG. 6 shows processed EPI pin images corresponding to the images of FIG. 2. The processed images of FIG. 6 are obtained by applying the 2D LFM window of FIG. 4 to the unprocessed images as follows:

$$R_w(x,y) = W(x,y) \times R(x,y)$$

where $R_w(x,y)$ is the processed image;

$R(x,y)$ is the unprocessed residual image data as in FIG. 2;

$W(x,y)$ is the window function.

Processed images 605, 610, 615, 620, 625, 630, and 635 correspond to unprocessed images 205, 210, 215, 220, 225, 230, and 235. As in FIG. 2, the maximum and minimum values of these images are calculated for FSFQR/FSFQD values, and the maximum amplitudes (i.e., maximum value−minimum value) are shown in order in row 640 beneath the mesh plots. It is seen that the fitting artifacts in the region boundaries, particularly at the corners, have been effectively suppressed. As a result, improved signal definitions are obtained, and the EPI pin signals are well separated from the signals from the reference regions. For example, the maximum processed signal amplitude for reference region 630 is 6.956, as compared to 12.9036 for the unprocessed signal amplitude for corresponding reference region 230. The EPI pin signals are unaffected by the window application, since they occur in the central, unattenuated window region.

Figure 7A:
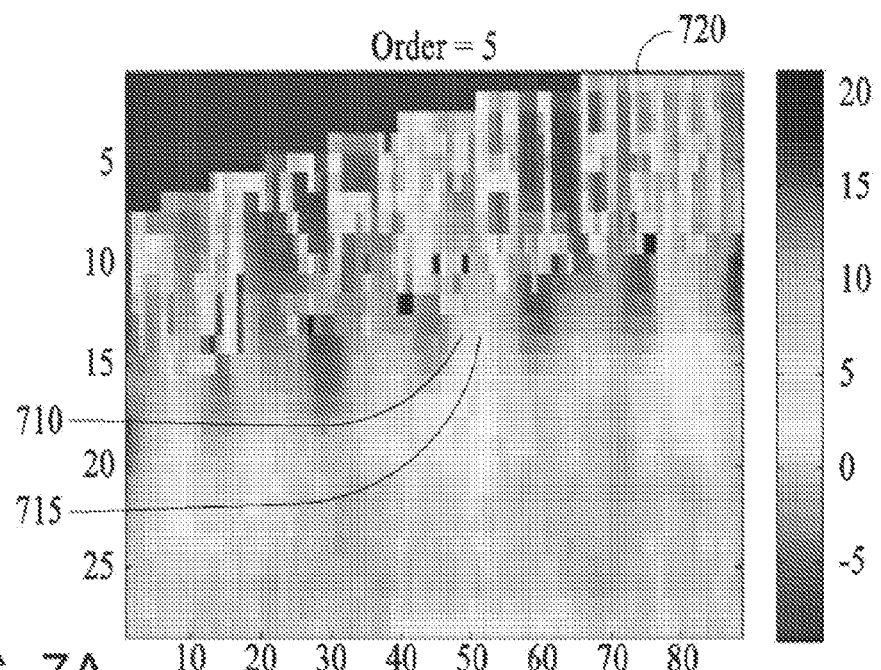
FIG. 7A shows a laser mark feature using a rectangular image region.
Figure 7B:
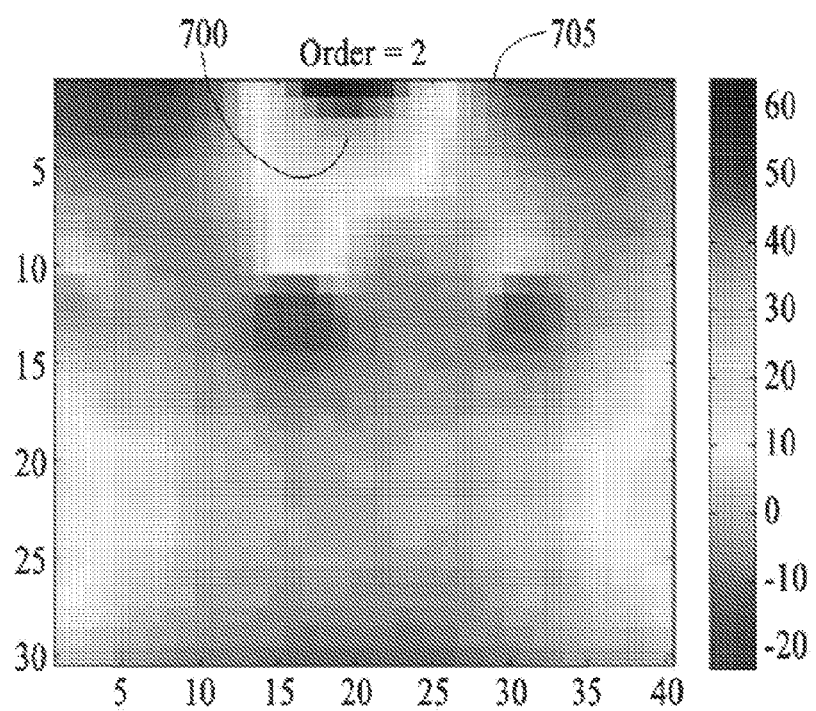
FIG. 7B shows a notch feature using a rectangular image region.
Figure 8:
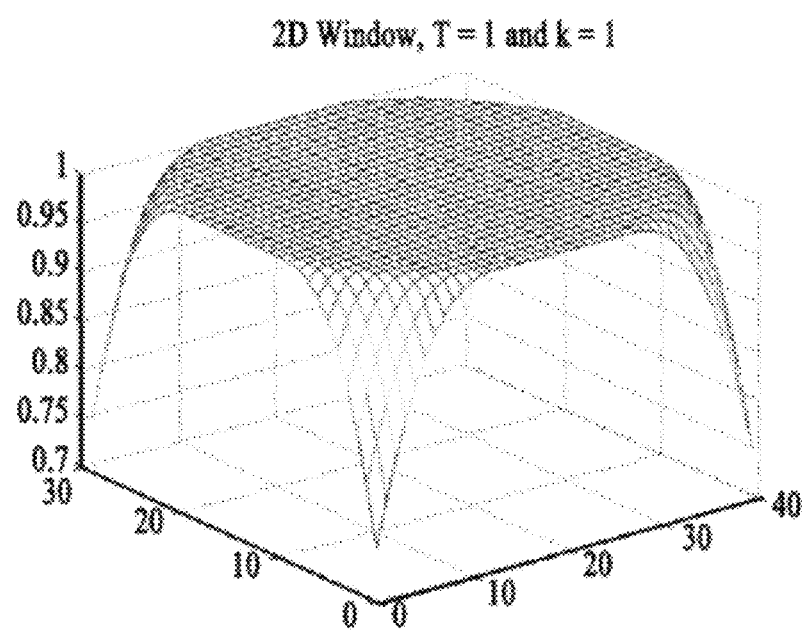
FIG. 8 shows a window used for a notch feature, having window parameter T set to 1.0.

Window parameters can be adjusted for optimal preservation of the signal of interest, plus suppression of boundary fitting artifacts, for various types of features of interest. EPI pin regions with square images have been described above, using window weight contours which are circular in the center region. FIG. 7A and FIG. 7B show laser mark and notch features respectively, both of which use rectangular image regions. In these cases, the window contours will be elliptical rather than circular. As shown in FIG. 7B, notch 700 is generally located near the center of top region boundary 705. In order to avoid losing signal from the notch due to windowing, for the notch case the window parameter T will be set to 1.0, resulting in the window shown in FIG. 8. For this window, while the signal at the corners is attenuated by about 25%, the signal at the center boundary (where the notch feature is) is not attenuated at all. For the laser mark case shown in FIG. 7A, the feature of interest is laser mark bump 710 which is located in center region 715 of laser mark image 720. The window for the laser mark uses the same window parameters T and K as does the window for the epi pin defect. The window widths and heights differ between the two, however, and the laser mark region can be rotated to align with the laser mark.

Figure 9A:
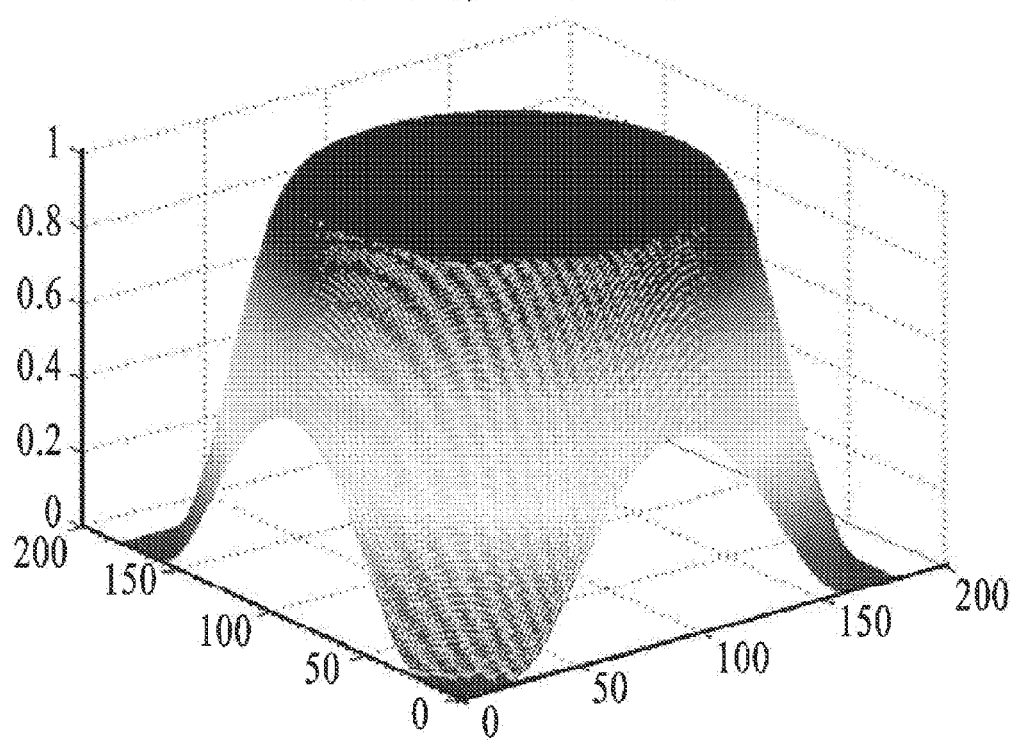
FIG. 9A shows a window used for stronger corner suppression. In this case, T=0.75, and k=2, which results in zero weighting in the corner regions.
Figure 9B:
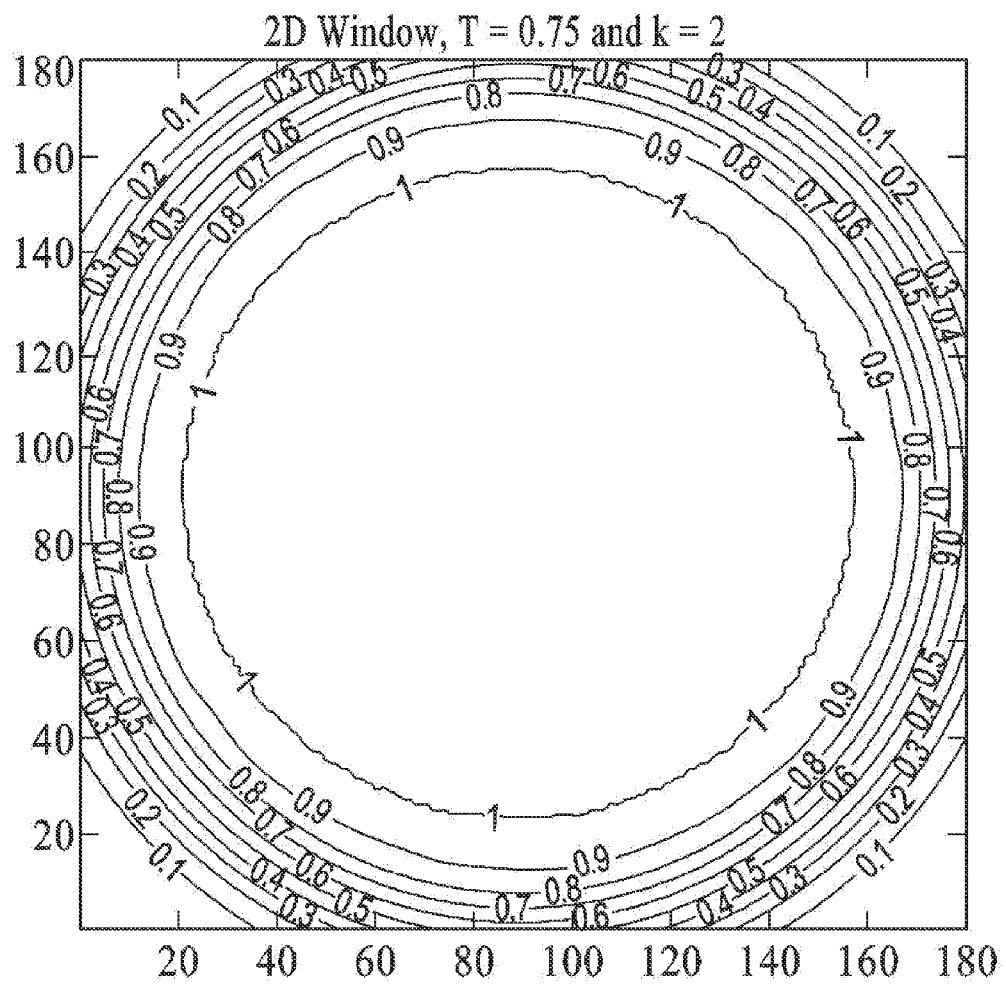
FIG. 9B shows a corresponding contour map for the window of FIG. 9A.

FIG. 9A shows a window that could be used for stronger corner suppression. In this case, T=−0.75, and k=2, which results in zero weighting in the corner regions. FIG. 9B shows a corresponding contour map for the window of FIG. 9A. Table 1 below summarizes various feature types and associated window parameters generally used for optimum balance of feature signal preservation and corner fitting artifact suppression.

TABLE 1

Typical Window Parameter for Different LRM Regions

| Region Type | Window Parameter T | Window Parameter k |
|---|---|---|
| EPI Pin | 0.75 | 1.00 |
| Laser Mark | 0.75 | 1.00 |
| Notch | 1.00 | 1.00 |

By using these windows to process the residual images from the surface filtering stage, improved LFM measurements with more accurate feature quantification and few artifact effects can be obtained.

B. Adaptive Filtering for Robust Peak and Valley Estimates in Surface Metrology Tools In many metrology tools for measuring wafer flatness and shape the maximum and minimum values in a given image region are used to calculate many metrics. Alternately, maximum positive signal values can be used. However, when moving to the higher resolution metrology for next generation nodes, the extreme statistics, particularly for the laser markings at the wafer edge regions, can result in severe degradation of measurement quality. The laser marked identification code provides a link between wafer properties or processing details and the wafer itself. The laser marking is generated by impinging a laser on the wafer surface and evacuating material. This process generates an identification code full of high frequency features that effect measurement consistency. A means for effectively dealing with the noise generated by high frequency measurement noise, such as the laser marking, is necessary for a repeatable metrology measurement of more substantial unwanted localized features in this region.

A method for filtering data from measurements of localized features on wafers, as in step 115, is disclosed. This method performs adaptive filtering using extreme data samples, for improved estimates of surface peak and valley values. In other words, the filtering behavior is adaptively adjusted according to the statistics of the extreme data samples. The method can effectively reduce high amplitude spike noise, and smooth down low amplitude background noise. In an exemplary embodiment, six extreme data samples are used, including three maximum values and three minimum values. (The use of six samples is exemplary and not limiting: the method can be extended to use different numbers of data samples.) Depending on the spread of the sample values, the filter output can be very close to the simple mean of three maximum or minimum data samples, the trimmed mean of two data samples, or the median of the three samples. The method uses the spread information of the extreme data samples to adaptively control the filter coefficients so that, depending on the sample spread and the estimated noise level, the filter can switch optimally from average filter, trimmed average filter, or median filter. More stable, robust measurement results can be obtained due to the adaptive nature of this method, and, on average, more than 20% precision improvement can be achieved, as has been shown experimentally.

Figure 10:
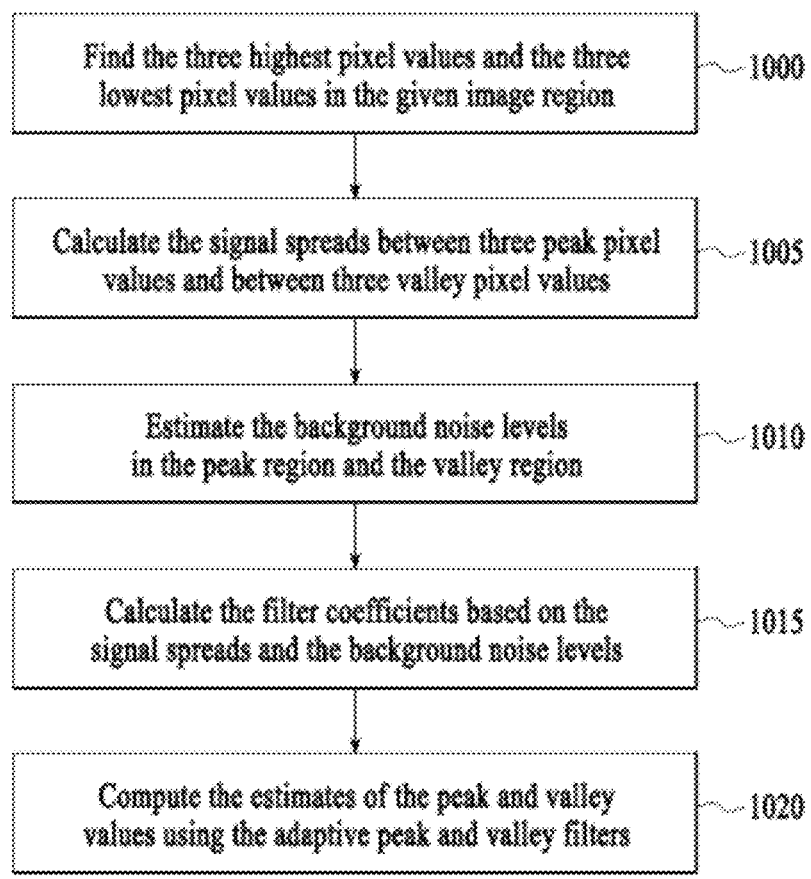
FIG. 10 illustrates an exemplary flow diagram for the inventive method of adaptive filtering for improved peak and valley estimates.

FIG. 10 illustrates an exemplary flow diagram for the inventive method of adaptive filtering for improved peak and valley estimates.

In step 1000, find the three maximum pixel values and the three minimum pixel values in the given image region. (Note that, if the signal is slowly varying with respect to the pixel size, the extreme values will most likely be in adjacent pixels, whereas sharp spikes may occur in isolated pixels.) Call them $V_{max1}$, $V_{max2}$, $V_{max3}$ and $V_{min1}$, $V_{min2}$, $V_{min3}$, with $V_{max1} \geq V_{max2} \geq V_{max3}$ and $V_{min1} \leq V_{min2} \leq V_{min3}$.

In step 1005, calculate the signal spread between the three peak (maximum) pixel values, i.e., $V_{max1} - V_{max2} = \delta_{12}$, $V_{max2} - V_{max3} = \delta_{23}$, and correspondingly for the $V_{min}$ values.

In step 1010, estimate the background noise levels in the peak region If, as is generally the case, the three maximum pixels are closely located in a first peak region, and the three minimum pixels are closely located in a second valley region, the noise level in the peak region and the noise level in the valley region may be separately estimated and used in the calculations of the weighting coefficients for the peak values and valley values respectively. A simplified calculation can calculate the average noise level for the entire image region, and use the single value for both the filtered peak and filtered valley calculations.

In step 1015, calculate the filter weighting coefficients for the peak values and the valley values, based on the signal spreads and the background noise levels, i.e. variances σ, for each set of values The weighting coefficients $w_1$, $w_2$, and $w_3$ are calculated as $$w_1 = \exp(-(\delta_{12})^2/\sigma^2); w_2 = 1.0; w_3 = \exp(-(\delta_{23})^2/\sigma^2)$$

$w = w_1 + w_2 + w_3$, and the normalized weighting coefficients are $$w_1' = w_1/w; w_2' = w_2/w; w_3' = w_3/w.$$

In step 1020, compute the estimates of the robust filtered peak and valley values using the adaptive peak and valley filters. The filtered peak value is $$V_{max} = w_1' V_{max1} + w_2' V_{max2} + w_3' V_{max3}$$

And the filtered valley value $V_{min}$ is calculated correspondingly.

Note that:
1. When the peak value $V_{max1}$ has a very large deviation from the second highest value $V_{max2}$, compared to the estimated variance in the image region, the weighting coefficient w1 nears zero. Therefore, in this case, $V_{max1}$ contributes very little to the filter output, and can be effectively removed as an outlier. In this case, the filter output becomes the trimmed mean of the two data samples $V_{max2}$ and $V_{max3}$. A corresponding filter output for the valley values is obtained.
2. When the three maximum (similarly for the minimum) data samples have a large spread, i.e., both $V_{max1}$ and $V_{max3}$ have large deviations from $V_{max2}$ compared to the estimated variance in the image region, then both w1 and w3 near zero. In this case, the filter becomes a conventional median filter, with the filter output substantially equal to $V_{max2}$, the median value of the three data samples.
3. When the three maximum (similarly for the minimum) data samples are closely distributed compared to the estimated variance in the image region, then the three coefficients w1, w2, and w3 will be approximately equal to one another. In this case, the filter output will be very close to the mean of the three data samples, i.e., pixel values.
4. The estimated variance (or the two estimated variances in the peak and valley regions) can be scaled first, and then used in the filtering, to adjust the transition point of the filter behavior.

Range Compensation

Using the filtered peak/valley signal estimates as in step 1020 yields an estimated range value equal to Vpeak(filtered)−Vvalley(filtered). This estimated range value is smaller than the unfiltered range obtained using the absolute Vmax and Vmin, since the filtering smoothes the maximum and minimum values, lowering their excursions from the mean value. Therefore, if desired, these range value shifts from the original maximum/minimum can be compensated by a multiplicative factor, which is determined as described below.

In general, the difference between the estimated filtered range and the unfiltered range depends on the noise level in the image region and the number of pixels in the region. The estimated filtered peak and valley values are as follows:

$$V_{peak} = \frac{\exp(-(V_{max1} - V_{max2})^2/\sigma^2)V_{max1} + V_{max2} + \exp(-(V_{max3} - V_{max2})^2/\sigma^2)V_{max3}}{\exp(-(V_{max1} - V_{max2})^2/\sigma^2) + 1.0 + \exp(-(V_{max3} - V_{max2})^2/\sigma^2)}$$

$$V_{valley} = \frac{\exp(-(V_{min1} - V_{min2})^2/\sigma^2)V_{min1} + V_{min2} + \exp(-(V_{min3} - V_{min2})^2/\sigma^2)V_{min3}}{\exp(-(V_{min1} - V_{min2})^2/\sigma^2) + 1.0 + \exp(-(V_{min3} - V_{min2})^2/\sigma^2)}$$

Since the filter outputs as in the above equations are non-linear functions of the data samples, it is difficult to derive an exact theoretical relation between the range from the filter and the range from the original maximum/minimum approach. Simulations may be run to investigate the relation between these two ranges. In the simulations, the data is assumed to have normal distributions.

Figure 11A:
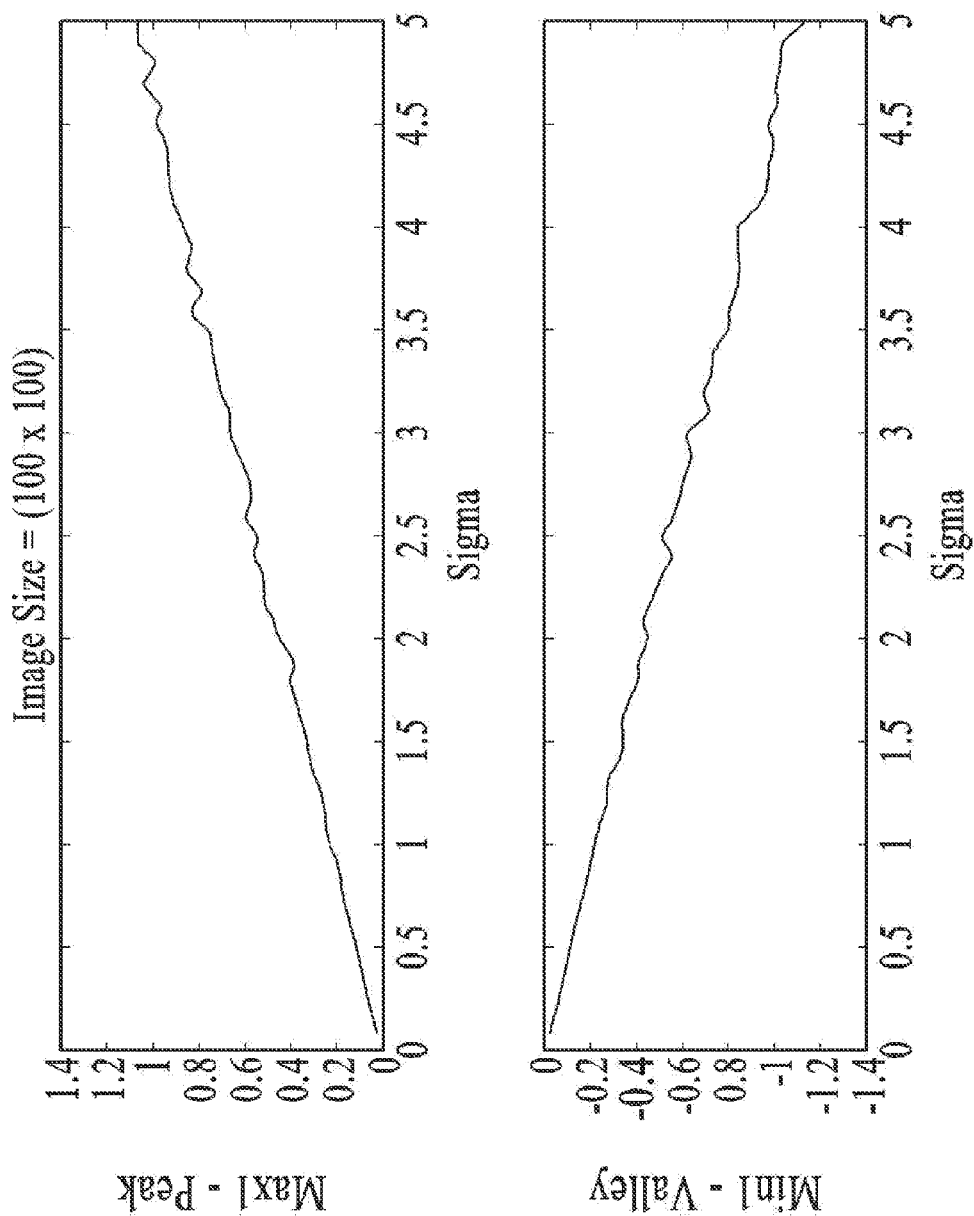
FIG. 11A shows simulated shifts of filtered peak and valley values for an image region with 100×100 pixels.
Figure 11B:
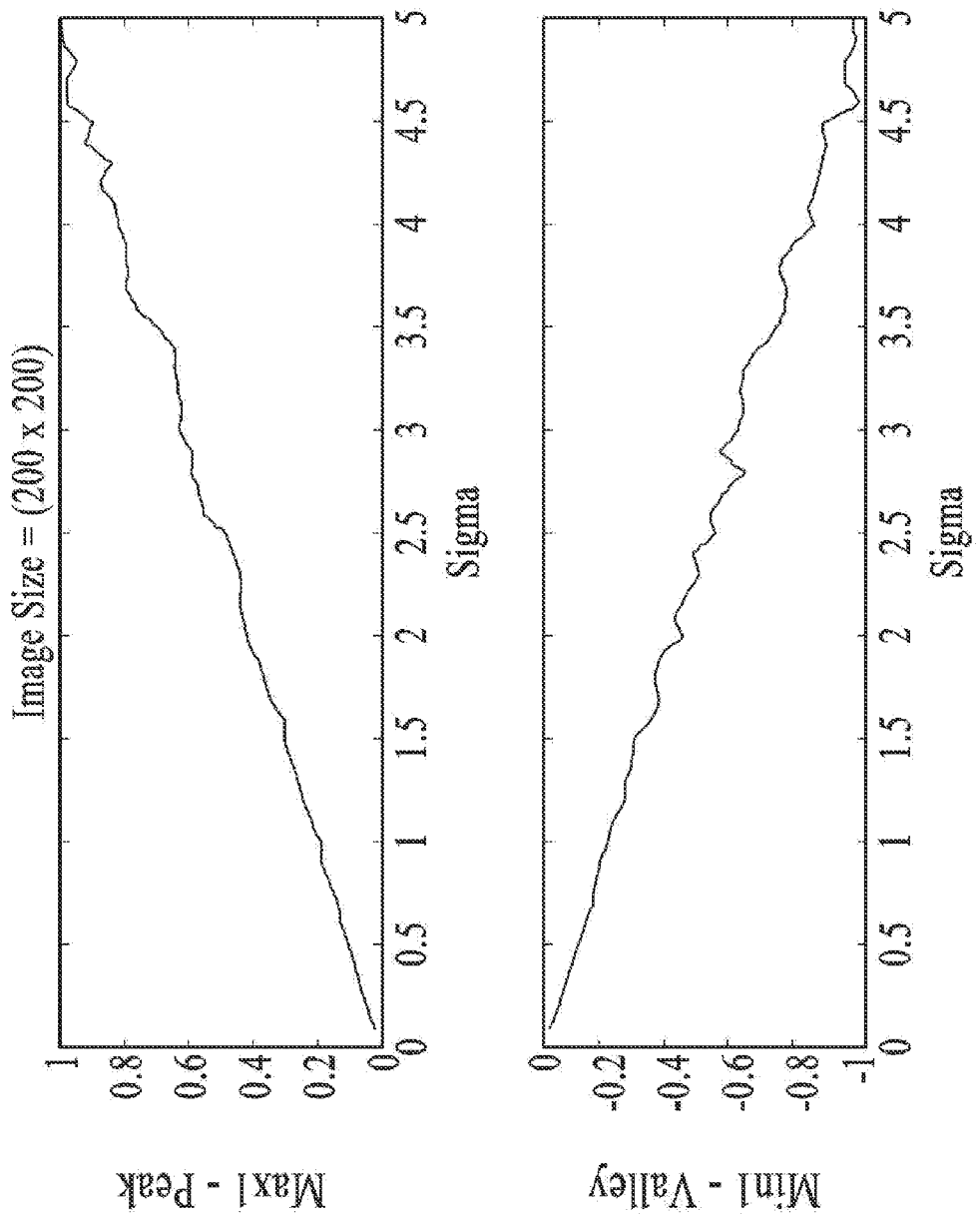
FIG. 11B shows simulated shifts of filtered peak and valley values for an image region with 200×200 pixels.
Figure 11C:
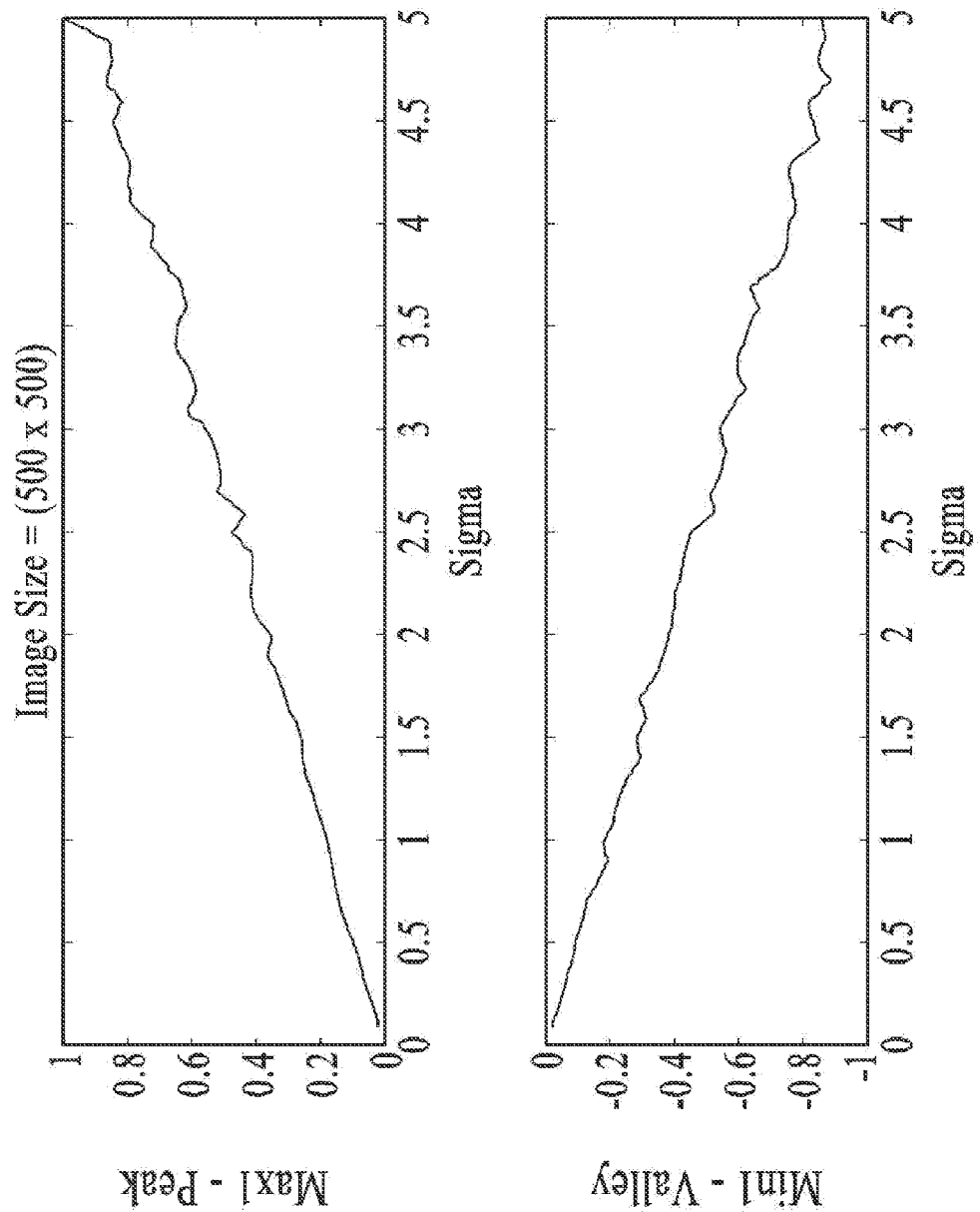
FIG. 11C shows simulated shifts of filtered peak and valley values for an image region with 500×500 pixels.

FIGS. 11A-11C show simulated shifts of filtered peak and valley values from unfiltered values, for image regions of pixel sizes 100×100, 200×200, and 500×500, as a function of noise level sigma. In these figures it is seen that the deviation of the filtered range from the unfiltered range increases as sigma increases. The amount of the deviation is also dependent on the number of pixels in the measurement region. Since these graphs are well described by linear functions, they can provide accurate guides for range compensation, if the image region size and estimated noise level sigma are known.

C. Summary

As shown in the flow diagram of FIG. 1, use of the 2D window for artifact suppression, and use of the adaptive filtering for robust peak and valley estimates can be combined to provide a more robust and more accurate Localized Feature quantification methodology.

System Considerations

Figure 12:
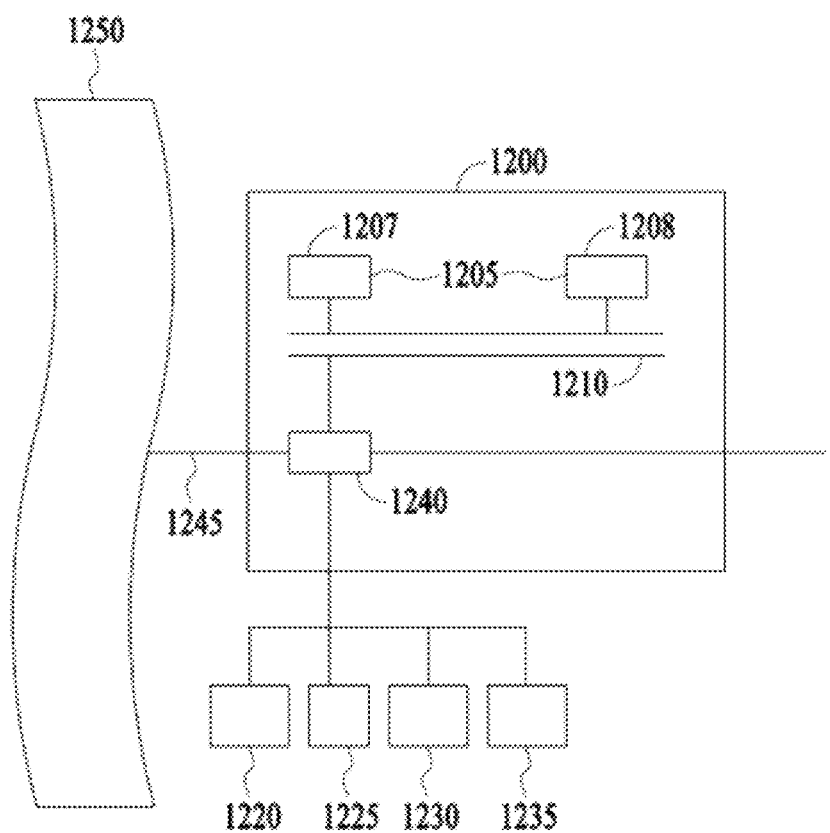
FIG. 12 illustrates an exemplary computer system that may be used to implement portions of the inventive methods.

The inventive methods or portions thereof may be computer-implemented. The computer system, illustrated in FIG. 12, may include a processor 1200 (e.g. a processor core, a microprocessor, a computing device, etc), memory 1205 which may include a main memory 1207 and a static memory 1208, which communicate with each other via a bus 1210.

The machine may further include a display unit 1215 that may comprise a touch-screen, or a liquid crystal display (LCD), or a light emitting diode (LED) display, or a cathode ray tube (CRT). As shown, the computer system also may include a human input/output (I/O) device 1220 (e.g. a keyboard, an alphanumeric keypad, etc), a pointing device 1225 (e.g. a mouse, a touch screen, etc), a drive unit 1230 (e.g. a disk drive unit, a CD/DVD drive, a tangible computer readable removable media drive, an SSD storage device, etc), a signal generation device 1235 (e.g. a speaker, an audio output, etc), and a network interface device 1240 (e.g. an Ethernet interface, a wired network interface, a wireless network interface, a propagated signal interface, etc).

The drive unit 1230 may include a machine-readable medium on which is stored a set of instructions (i.e. software, firmware, middleware, etc) embodying any one, or all, of the methodologies described above. The set of instructions is also shown to reside, completely or at least partially, within the main memory 1207 and/or within the processor 1200. The set of instructions may further be transmitted or received via the network interface device 1240 over the network bus 1245 to network 1250.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical, acoustical or other form of propagated signals (e.g. carrier waves, infrared signals, digital signals, etc); or any other type of media suitable for storing or transmitting information.

It is not expected that the present invention be limited to the exact embodiments disclosed herein. Those skilled in the art will recognize that changes or modifications may be made without departing from the inventive concept. By way of example, different types of filtering other than DG and polynomial fitting can be used. By further way of example, in addition to the specifically disclosed local features such as epi pin, laser mark and notch bumps, for which standard recipes have been developed, users can also process unspecified features, with a lot of flexibility to adapt to any high frequency surface features. Different measurement window sizes and shapes can be selected, flexible measurement locations can be set, and proper fitting order can be used for surface shape correction. The scope of the invention should be construed in view of the claims.

With this in mind, we claim:

1. A computer-based method for localized feature-based wafer surface quantification including the steps of:
    inputting raw surface geometry data from at least one of a wafer front surface map and a wafer back surface map;
    defining a region of interest encompassing a localized feature of interest;
    performing surface fitting to remove low frequency components of said raw surface geometry data in the region of interest to yield a residual image;
    constructing a two dimensional localized feature metrics (LFM) window encompassing said region of interest;
    applying said two dimensional LFM window to said residual image to suppress edge and corner artifacts, yielding a window-processed residual image; and
    processing said window-processed residual image to provide substantially accurate and robust characterization and quantification of said localized feature of interest.

2. The method of claim 1, further including the steps of simultaneously defining and characterizing multiple said regions of interest.

3. The method of claim 1, further including the step of inputting raw data from a wafer thickness map.

4. The method of claim 1, wherein said step of defining a region of interest includes said region of interest being defined with a shape adapted to correlate with a configuration of said localized feature of interest.

5. The method of claim 4, wherein said localized feature is an epitaxy (EPI) pin feature and said region of interest is square.

6. The method of claim 4, wherein said localized feature is a notch and said region of interest is rectangular.

7. The method of claim 4, wherein said localized feature is a laser mark bump and said region of interest is a rotated rectangular region.

8. The method of claim 1, wherein unwanted effects from features near said region of interest are removed by masking said features near said region of interest.

9. The method of claim 1, wherein said surface fitting is polynomial surface fitting to a polynomial with an order chosen according to configuration of said localized feature of interest.

10. The method of claim 1, wherein said window-processed residual image is displayed as one of: a two-dimensional image, and a three-dimensional image.

11. The method of claim 1, further including the step of calculating feature metrics of said localized feature of interest, using maximum positive values from said window-processed residual image.

12. The method of claim 1, wherein said two dimensional LFM window is configured such that corner fitting artifacts are suppressed in said window-processed residual image, and such that said localized feature of interest is preserved in said window-processed residual image.

13. The method of claim 1, further including the step of estimating peak and valley signal values of said residual image using robust peak/valley filtering.

14. The method of claim 13, wherein said robust peak/valley filtering comprises adaptive filtering of a user-determined number of extreme peak and valley data samples to provide robust peak/valley value estimates.

15. The method of claim 14, further including the step of calculating feature metrics of said localized feature of interest, using said robust peak/valley value estimates from said window-processed residual image.

16. The method of claim 14, further comprising the step of compensating for range value shifts caused by said adaptive filtering; said compensating comprising multiplying said signal values by a multiplicative factor determined by estimated noise level and number of pixels in said region of interest.

17. A high volume manufacturing method for wafer grading/factory automation, including localized feature-based wafer surface quantification as in claim 1.

18. A computer configured to execute the steps of:
    inputting raw surface geometry data from a wafer front surface map and a wafer back surface map;
    defining a region of interest encompassing a localized feature of interest;
    performing surface fitting to remove low frequency components of said raw surface geometry data in the region of interest to yield a residual image;

constructing a two dimensional localized feature metrics (LFM) window encompassing said region of interest;

applying said two dimensional LFM window to said residual image to suppress edge and corner artifacts, yielding a window-processed residual image; and processing said window-processed residual image to provide substantially accurate and robust quantification of said localized feature of interest.

19. A computer-readable device containing computer executable instructions for performing a method comprising the steps of:

inputting raw surface geometry data from a wafer front surface map and a wafer back surface map;

defining a region of interest encompassing a localized feature of interest;

performing surface fitting to remove low frequency components of said raw surface geometry data in the region of interest to yield a residual image;

constructing a two dimensional localized feature metrics (LFM) window encompassing said region of interest;

applying said two dimensional LFM window to said residual image to suppress edge and corner artifacts, yielding a window-processed residual image; and processing said window-processed residual image to provide substantially accurate and robust quantification of said localized feature of interest.

* * * * *